United States Patent [19]
Simons

[11] 3,982,062
[45] Sept. 21, 1976

[54] VIDEO ENCRIPTION SYSTEM
[75] Inventor: Kenneth Simons, Huntington Valley, Pa.
[73] Assignee: Jerrold Electronics Corporation, Horsham, Pa.
[22] Filed: July 26, 1973
[21] Appl. No.: 382,820

[52] U.S. Cl. .................................. 178/5.1; 325/60; 325/138
[51] Int. Cl.² ......................................... H04N 1/44
[58] Field of Search ................. 325/60, 32, 65, 138; 178/5.1, DIG. 13, DIG. 6

[56] References Cited
UNITED STATES PATENTS

| | | | |
|---|---|---|---|
| 1,258,548 | 3/1918 | Englund | 325/138 |
| 2,173,156 | 9/1939 | Beverage | 325/65 |
| 3,081,376 | 3/1963 | Loughlin et al. | 178/5.1 |
| 3,084,329 | 4/1963 | Clay | 325/60 |
| 3,353,099 | 11/1967 | Hayasi et al. | 325/60 |

Primary Examiner—Maynard R. Wilbur
Assistant Examiner—S. C. Buczinski
Attorney, Agent, or Firm—John M. Calimafde; Stephen B. Judlowe

[57] ABSTRACT

Encription apparatus for restricting distribution of private (e.g., premium) video programs propagated by a CATV cable network, radiation or the like employs picture carrier isolating, phase shifting and linear combining structure for rendering the transmitted video information unrecoverable by conventional television receivers. Authorized receiving stations are provided with inversely functioning electronics which reconstitute the prescribed video amplitude modulation format to permit signal reception. Similar audio program modification and correction structure permits encription and selective reception of the sound portion of the distributed programming.

14 Claims, 5 Drawing Figures

VIDEO ENCRIPTION SYSTEM

This invention relates to video distribution systems and, more specifically, to electronic encription apparatus for permitting reception of selected video information only at subscriber stations employing suitable decription equipment.

It is an object of the present invention to provide improved composite video program encription apparatus.

More specifically, it is an object of the present invention to provide video encription apparatus wherein encription and signal recovery are simply and reliably effected by linear carrier phase shifting and summation operations.

The above and other objects of the present invention are realized in a specific, illustrative encription system for rendering an output television program (e.g., radiated by an antenna or impressed on a cable via CATV head end apparatus) unrecoverable by a conventional television receiver. The encription apparatus rotates the video carrier by carrier isolating, phase shifting and signal summation operations — to vary outgoing video information from the prescribed amplitude modulation format.

Inverse operations are implemented by decoding equipment supplied to authorized viewers of the encripted program (e.g., CATV system subscribers who pay an extra fee for special, private programming such as sporting events, theater or the like). That is, carrier extracting, phase shifting and linear combining operations as employed to reconstitute the requisite A.M. video signal.

Similarly, the audio portion of a program is modified at the transmitter by insertion of a pseudo audio subcarrier, such that audio intelligence is lost in conventional receivers by the capture effect. However, the special recovery equipment provided authorized subscribers restores the audio carrier to proper format by suppressing the pseudo subcarrier, permitting reception thereof.

The above and other objects, features and advantages of the present invention will become more clear from a detailed description thereof, presented hereinbelow in conjunction with the accompanying drawing, in which.

Figures 1A, 1B, 1C:
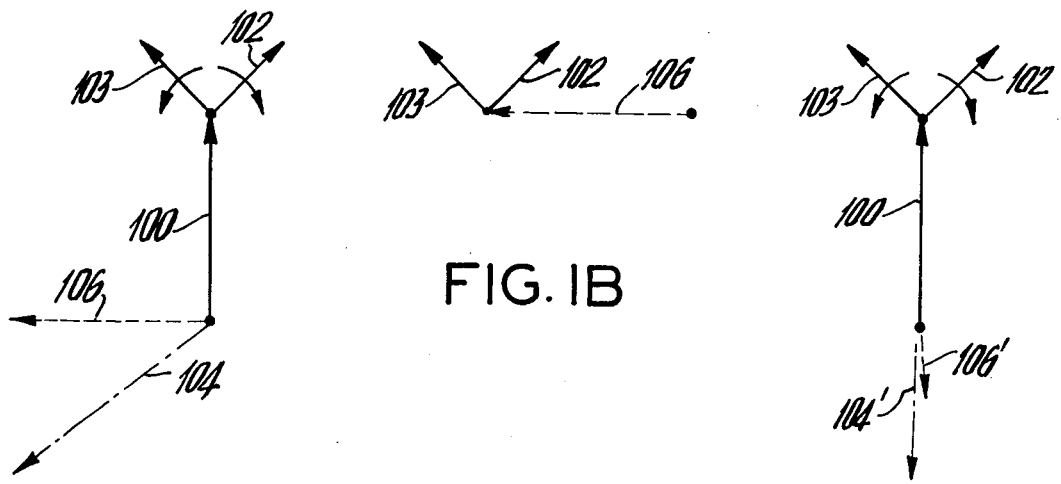
FIGS. 1A–1C are phaser diagrams depicting the underlying principles of video encription apparatus embodying the principles of the present invention.

Referring now to FIGS. 1A–1C, there is shown by conventional phaser symbolism the principles underlying video encription in accordance with the present invention. It will be understood that such encription is effected to the video portion of a television program distributed to viewers, either through air radiation, via a coaxial cable in a CATV system, or the like, audio program encription being discussed below. The purpose of such encription is to permit reception of an ensemble of television programs (e.g., locally available, off air programs in a CATV context) for all subscriber stations connected to the distribution system, while permitting only selected ones of subscribers to receive the special programs. This selective reception of signal programming may be desired by reason of some sensitivity regarding the program content; or for revenue purposes where the information comprises proprietary and valuable software such as noteworthy sporting events, first run movies and the like.

Referring first particularly to FIG. 1A, there is shown a video carrier 100 and two counter rotating phasers 102 and 103 representing the spectrum of video intelligence conventionally amplitude modulating the carrier 100. A signal in the form of picture carrier 100 and phasers 102 and 103 conforms to the FCC prescribed transmission format and is recoverable by standard television receivers.

To restrict access to the program initially represented by the vectors 100, 102 and 103 there is generated at the signal transmitter apparatus a wave 104 at the picture carrier frequency, but characterized by a phase distinct from that of the signal 100. Different phases for the encripting pseudo video carrier 104 (and 104') are shown for the encripting operations of FIG. 1A and FIG. 1C.

Focusing again upon the FIG. 1A embodiment, the picture carrier frequency waves 100 and 104 are linearly summed to provide a resultant picture frequency carrier 106 — in this case having a phase orthogonal to the original carrier 100. The wave 106, and the video intelligence bearing phasers 102 and 103 which are distributed to receiving stations are shown in FIG. 1B for clarity. It will be appreciated that the phasers 102 and 103 now phase (frequency) modulate the carrier 106 rather than providing amplitude modulation as was formerly the case. The frequency modulation of FIG. 1B will simply not be received by standard receivers which are constructed to process video amplitude modulation. Thus as only one manifestation of this, the vertical and horizontal synchronization pulses, and sync tips, which produce large amplitude signal variations in their proper amplitude modulation format, produce very small amplitude variations in the FIG. 1B transmission procedure. Accordingly, there can be no horizontal and vertical synchronization, and thus no video display, at conventional receivers. By similar mechanisms, the actual video content is lost as well. Thus, conventional receivers adapted for amplitude video demodulation simply cannot process a video transmission in the form of FIG. 1B.

At selected receiver stations which are authorized to receive the private programming, an inverse series of operations are carried out in converter apparatus to supply a reconstituted amplitude modulation signal to a conventional television receiver connected thereto. This is done by isolating the carrier 106 in a narrow band filter; phase shifting the isolated picture carrier frequency wave (somewhere into the first quadrant, depending upon amplitude, for the wave 106 shown in FIGS. 1A and 1B) and combining (linearly adding) the incoming picture carrier 106 with the shifted wave to again reconstitute the original phase of the picture carrier 100. The composite video signal so implemented is then supplied to the conventional receiver for standard processing.

The phase shifting operation schematically depicted in FIG. 1C operates in a manner similar to that shown in FIG. 1A. However, in the FIG. 1C case, the transmitted, pseudo picture frequency carrier 106' is opposite in phase to the original picture carrier 100, this being effected by linearly adding to the carrier 100 an oppositely phased wave 104' which is larger than the original carrier. Since the phase of the transmitted carrier 106' is opposite to that of the original carrier 100, the polarity of the video intelligence received by a conventional receiver is inverted. Thus, again, a conventional receiver is totally incapable of responding to the transmitted signal by generating synchronizing information or a proper video display.

It will be appreciated that the ± 90° and 180° picture carrier shifting cases illustrated in FIGS. 1A and 1C only typify encription operation in accordance with the principles of the present invention. There in fact is a continuum of shifted video carrier phases which will inhibit proper television receiver response which degrades upon any substantial carrier shifting.

The mechanism relied upon to prevent unauthorized reception of the sound portion of the private television program simply comprises adding to the sound program transmission a pseudo sound subcarrier which is larger than the original sound subcarrier and which is spaced in frequency therefrom, e.g., by 10 KHz. Standard receivers will treat the larger pseudo subcarrier as the apparent incoming F.M. sound carrier by reason of the well-known capture effect, thereby totally obviating the ability of the sound recovering portion of a standard receiver to frequency demodulate the transmitted sound program.

Figure 2:
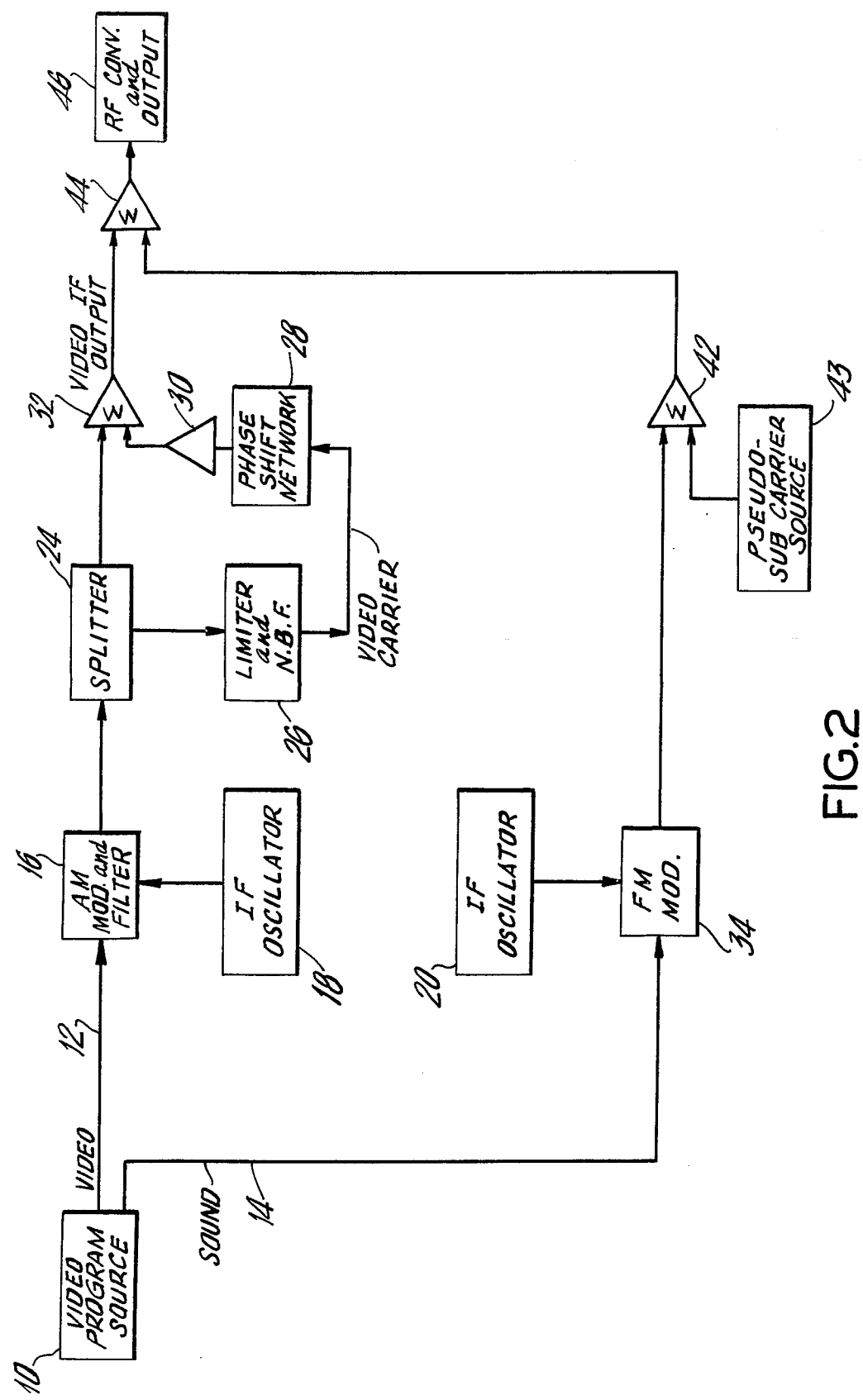
FIG. 2 is a block diagram depicting transmission-encripting apparatus embodying the principles of the present invention.

Transmitter apparatus for implementing the above-considered encripting principles is shown in FIG. 2. A video program source 10 of any description supplies base band (or modulated) video information via a lead 12 to a modulator 16 also receiving an intermediate frequency video carrier via a source 18 thereof. The output of modulator 16 is thus video at IF, which is supplied by a splitter 24 to a linear summing network 32, and to a limiter and narrow band filter 26. The circuitry 26, tuned to the IF picture frequency, extracts and passes only the picture carrier without its concomitant modulation (this corresponds to the vector 100 in FIGS. 1A and 1C). The circuitry 26 for extracting the picture carrier may be conventional limiter and narrow band filter apparatus well-known to those skilled in the art, or may be a phase locked loop for effecting such operations, this structure for the circuitry 26 also being implementations for the similarly functioning elements 54 and 60 in FIG. 3.

The picture carrier frequency wave extracted by the circuitry 26 is shifted in phase by a phase shifting network 28, buffered and amplified by an amplifier 30, and supplied as a second input to the summing network—amplifier 32. The output of the structure 28–30 thus comprises the wave 104 or 104' of the encription processes of FIG. 1A or 1C.

The linear combining element 32 linearly sums the vectors 100 and 104 (FIG. 1A) or 100 and 104' (FIG. 1C) to provide the resultant, phased output carrier 106 (FIG. 1A) or 106' (FIG. 1C). This video output is combined with the sound portion of the television program at linear combiner 44 and supplied to output and driver structure 46. The structure 46 provides the heterodyned conversion to radio frequency (it is observed that RF modulation may be directly implemented by appropriate carrier sources 18 and 20); power output stages, and either antenna or cable driving structure, as required.

The video program source 10 supplies the base band (or modulated) sound portion of the television program via a lead 14 to a frequency modulator 34 which also receives the sound subcarrier wave from a source 20 thereof. The output from the modulator 34, comprising the standard sound subcarrier bearing frequency modulated audio intelligence, is supplied as a first input to a linear combining network 42. Also supplied to the combining network 42 is a pseudo sound carrier from a source 43 thereof, the pseudo subcarrier 43 exceeding the actual sound subcarrier in amplitude. The output of the combining network 42 then passes to the output equipment 46 via the summing equipment 44.

It is observed that three linear combining elements 32, 42, and 44 are shown for clarity of description only— these summing elements may be combined into a single structure.

Figure 3:
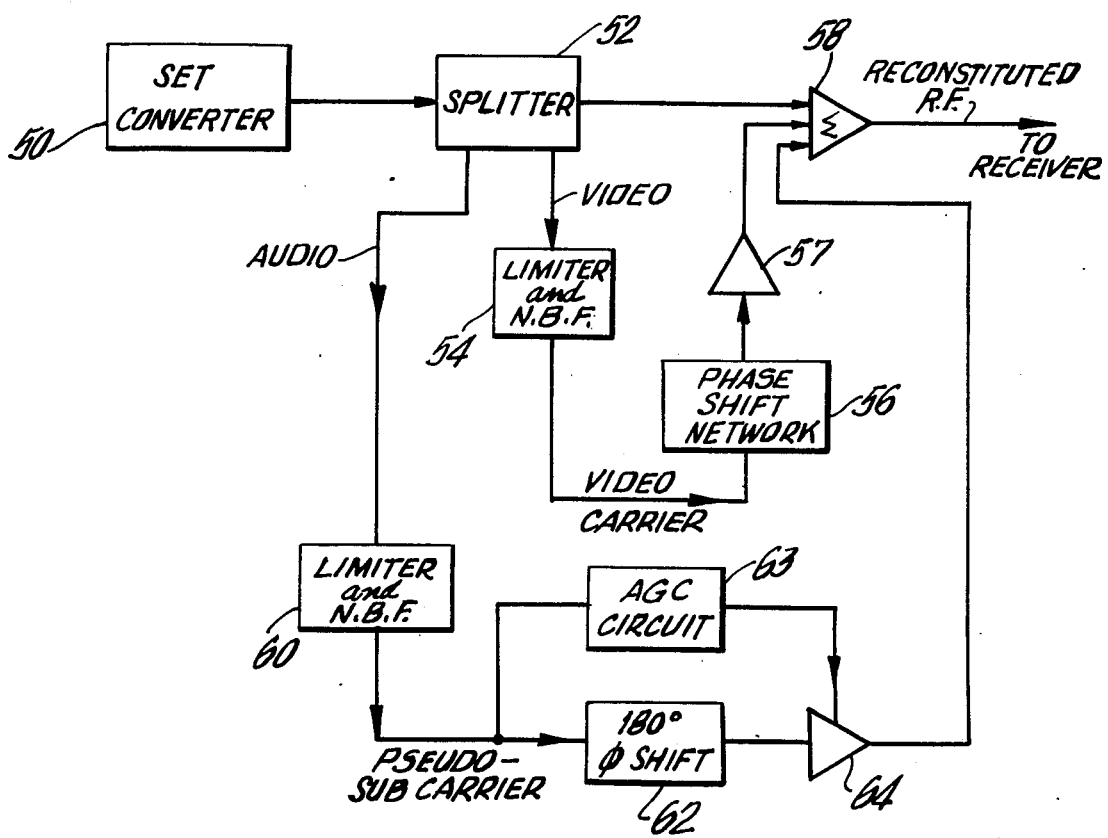
FIG. 3 depicts decription-reception apparatus for the transmitting structure of FIG. 2.

Turning now to FIG. 3, there is shown subscriber converter structure for permitting reception for the encripted video and audio programs produced by the FIG. 2 transmitter apparatus. A subscriber station converter 50 provides radio frequency amplification (if required) and heterodyning, to IF, and supplies the encripted IF video and audio programs via a splitter 52, to limiter-narrow band filters 54 and 60. Examining first the video recovery, the circuitry 54 recovers the transmitted picture carrier frequency wave stripped of its modulation (106–106'), and a phase shifting network 56 shifts the phase of the recovered carrier wave by an amount which, when combined with the transmitted picture carrier 106 and 106', results (by vector addition) in the desired, original carrier wave 100. Thus, the wave 106 of FIG. 1A would be shifted into the first quadrant (the specific angle depends upon amplitude), while that of the transmission scheme of FIG. 1C would be shifted 180°. The resulting composite video signal at the output of the summing network 58 (supplied thereto by the two upper input leads shown in FIG. 3) would identically comprise the proper amplitude modulated information which is then supplied to a conventional television receiver for signal recovery.

Examining now the audio decoding process, the limiter and narrow band pass filter 60 is tuned to, and extracts and isolates the pseudo subcarrier which is then shifted 180 electrical degrees by a phase shift network 62. The phase shifted pseudo subcarrier is amplified by a voltage controlled amplifier 64 and linearly combined with the transmitted audio program by a summing network 58 (the upper and lower leads to combiner 58). The transmitted pseudo sound subcarrier, and that produced by amplifier 64, are of an opposite phase and are adapted to be of equal amplitudes such that they cancel. Thus, the proper prescribed audio format for recovery by the FM detector portion of a standard television receiver is presented at the output of network 58.

An AGC network 63 may be employed to detect the level of the incoming pseudo subcarrier, as at the output of circuitry 60, and to control the gain of the amplifier 64 to provide for precise pseudo subcarrier cancellation. Alternatively, the output of amplifier 64 may be sensed and maintained in a fixed relation with a reference potential by conventional AGC action. Comparable AGC structure may be employed as well for video signal decription to vary the gain of amplifier 57.

The above-described arrangements are merely illustrative of the principles of the present invention. Numerous modifications and adaptations thereof will be readily apparent to those skilled in the art without departing from the spirit and scope of the present invention.

What is claimed is:

1. In combination in video program encription apparatus for encripting the transmisson of a video program signal comprising video information amplitude modulating a video carrier and sound information frequency modulating in audio subcarrier, means for producing the video carrier without concomitant modulation products, means for phase shifting the video carrier, and means for linearly combining the amplitude modulated video carrier with said phase shifted video carrier for producing a resultant combination of said modulation products and a video carrier differing in phase from the original video carrier's phase, and receiver means for receiving said signal produced by said encription apparatus for reconstituting said phase shifted carrier to its original relative phase for permitting reception of said video program.

2. A combination as in claim 1 further comprising means for adding to said audio subcarrier and its concomitant frequency modulation products, a pseudo subcarrier spaced in frequency from said audio subcarrier, and larger in amplitude than said audio subcarrier.

3. A combination as in claim 2 further comprising means for linearly combining the video carrier and audio subcarrier and their concomitant modulation products, said phase shifted video carrier, and said pseudo audio subcarrier.

4. A combination as in claim 3 further comprising a source of video and audio programs, and modulation means for producing said amplitude modulated video carrier and said frequency modulated audio subcarrier at intermediate frequency.

5. A combination as in claim 4 further comprising output modulation and driver means connected to said combiner means.

6. A combination as in claim 1 further comprising converter means coupled to said encription apparatus for receiving the output encripted video program, said converter means including means for extracting from the signal received thereat from said encription apparatus the video carrier without its modulation products, means for shifting the phase of the received video carrier, and means for linearly combining said phase shifted video carrier with the received video signal.

7. A combination as in claim 3 further comprising converter means coupled to said encription apparatus, said converter means including means for extracting from said signal received from said encription apparatus the phase shifted video carrier without its modulation products, means for shifting the phase of said recovered video carrier, means for recovering the pseudo audio subcarrier, means for shifting the phase of the recovered pseudo audio subcarrier by 180 electrical degrees, and means for linearly combining said phase shifted video carrier and pseudo audio subcarrier with said composite incoming signal.

8. A combination as in claim 7 further comprising automatic gain control means for regulating the amplitudes of the output of said video carrier and pseudo audio subcarrier phase shifting means.

9. A combination as in claim 1 wherein said phase shifting means comprises means for shifting the phase of said video carrier by 180 electrical degrees.

10. A combination as in claim 6 wherein each of said phase shifting means comprises means for shifting the phase of said video carrier by 180 electrical degrees.

11. In combination in converter means for restoring an incoming received encripted video program to prescribed format for reception by a standard television receiver, said encripted video program comprising a video carrier varied in phase with respect to amplitude modulated intelligence-bearing sideband signals, the improvement comprising means for generating a signal at the video carrier frequency and characterized by a predetermined phase relationship with the incoming video carrier, and linear combining means for summing the carrier frequency wave supplied by said signal generating means with the incoming signal for producing a resultant carrier frequency wave exhibiting an amplitude modulation in phase relationship with said sideband signals.

12. The method of distributing encripted video information not recoverable by a conventional television receiver, comprising the steps of generating at least one video intelligence amplitude modulated side band and a carrier phase shifted from its original phase, distributing said phase shifted carrier and modulation signal to at least one subscriber location, and, at said subscriber location, reproducing the original carrier phase relative to said at least one modulated side band, and combining said reproduced carrier and said modulated side band to form permitting video signal demodulation by a conventional television receiver.

13. The method as in claim 12, wherein the step of reproducing the original carrier phase includes the steps of isolating the received phase shifted carrier, and shifting the phase of said isolated carrier.

14. A system for encoding and decoding an amplitude modulated signal having a carrier component and at least one set of side-bands comprising:
   means for shifting the phase of said carrier component relative to the phase of said side-bands by an amount sufficient to significantly distort the modulation envelope;
   means for transmitting said phase-shifted carrier component and said set of side-bands;
   means for receiving said transmitted signal; and
   means for summing said received signal with a corrective signal having a frequency, amplitude, and phase which restores the original, unphase-shifted amplitude and phase of said carrier component so as to render intelligible said modulation envelope.

* * * * *